Aug. 25, 1936.                  M. W. McCONKEY                  2,051,879
                                    BRAKE
                              Filed Feb. 11, 1929                2 Sheets-Sheet 1
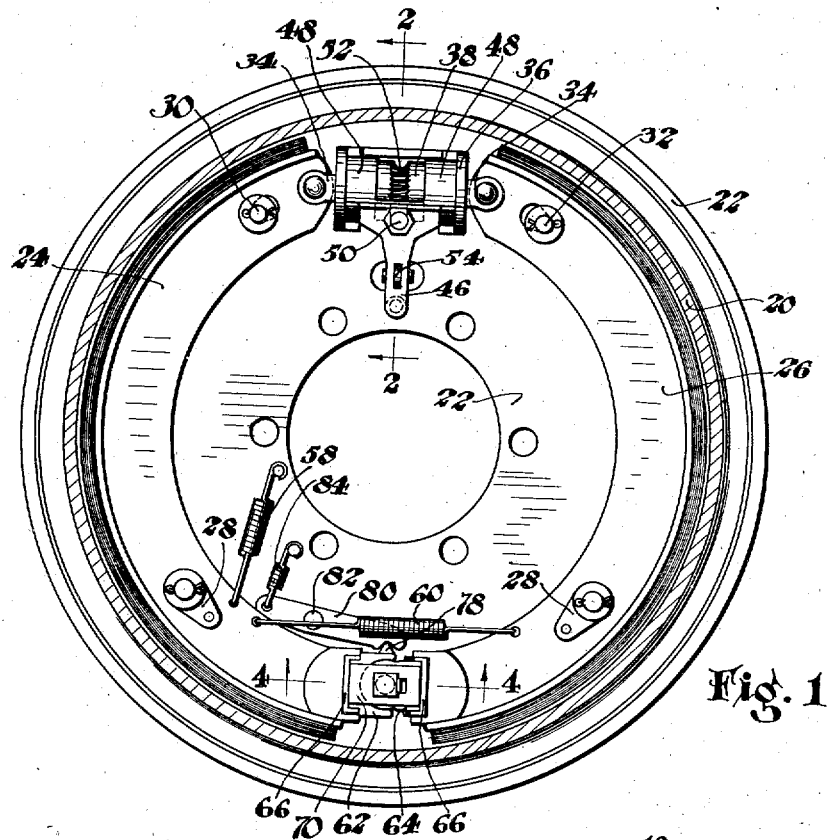
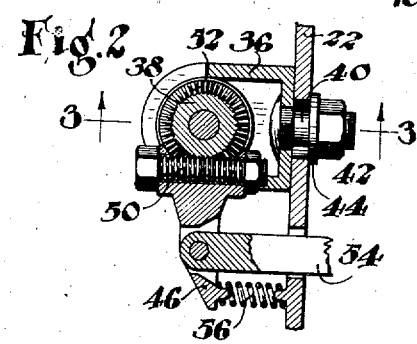
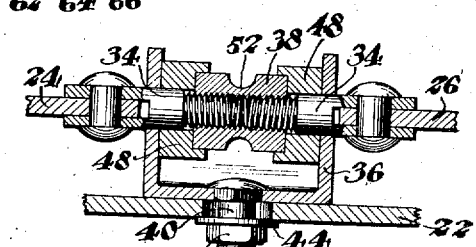
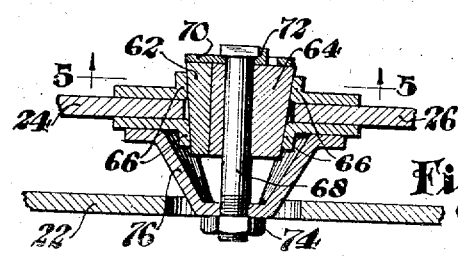
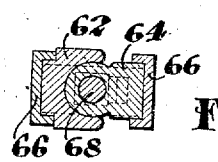
INVENTOR.
Montgomery W. McConkey Aug. 25, 1936.  M. W. McCONKEY  2,051,879
BRAKE
Filed Feb. 11, 1929   2 Sheets-Sheet 2

INVENTOR.
Montgomery W. McConkey

Patented Aug. 25, 1936

2,051,879

UNITED STATES PATENT OFFICE 2,051,879

BRAKE

Montgomery W. McConkey, South Bend, Ind., assignor to Bendix Brake Company, South Bend, Ind., a corporation of Illinois Application February 11, 1929, Serial No. 339,000

13 Claims. (Cl. 188—78)

This invention relates to brakes, and is illustrated as embodied in an internal expanding brake for an automobile.

One feature of the invention relates to a novel operating device for a brake or the like which includes a simple and effective arrangement of a right-and-left threaded nut, or an equivalent part, acting on thrust members engaging the brake friction means. The novelty of the invention resides, not only in the construction and arrangement of its parts, but also in its adaptability to a brake of the type which shifts its anchorage when the drum reverses its direction of rotation.

Other features relate to novel adjustable means for connecting the brake shoes, and to other novel and desirable structural details which will be apparent from the following description of the illustrative embodiments shown in the accompanying drawings, in which Figure 1 is a vertical section through the brake, just inside the head of the brake drum, showing the brake shoes in side elevation;

Figure 2 is a partial section, on the line 2—2 of Figure 1, showing the operating device;

Figure 3 is a section through the operating device, on the line 3—3 of Figure 1;

Figure 4 is a partial section, on the line 4—4 of Figure 1, showing the adjustment between the brake shoes;

Figure 5 is a section through the adjustment, on the line 5—5 of Figure 4;

Figure 6:
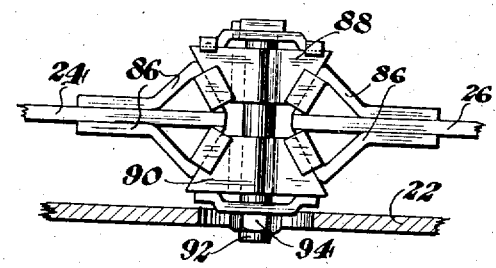
Figure 6 is a section corresponding to Figure 4, but showing a different adjustment.

The brake selected for illustration includes a rotatable drum 20, at the open side of which is arranged a suitable support such as a backing plate 22, and within which is arranged the friction means of the brake. The friction means is shown as including a pair of pivotally and adjustably connected shoes 24 and 26, provided with suitable shoe-positioning means 28, and so arranged that when the drum is turning clockwise the shoe 24 anchors on a fixed post 30 and when the drum is turning counter-clockwise the shoe 26 anchors on a fixed post 32.

The brake is applied by novel means shown as including thrust parts or plungers 34 pivotally connected to the shoe ends, and which are slidably mounted end to end in spaced alined bearings formed in a bracket 36. The adjacent ends of these parts 34 are formed respectively with right and left threads, or are otherwise formed, for operative engagement with a rotatably mounted nut or equivalent member 38, which in this case is right and left threaded at its opposite ends so that when turned it forces the shoes apart to apply the brake.

To allow the shifting of the anchorage described above, bracket 36 may have a stud 40 projecting through an opening in the backing plate and provided with means such as a nut 42 engaging a retaining washer 44 slidably engaging the backing plate 22.

Nut 38 may be operated by a novel lever 46, formed in two pieces riveted or otherwise secured together with nut 38 permanently mounted between them. Lever 46 may have as its hub two spaced alined portions 48 in which the externally-cylindrical nut 38 is journaled. Nut 38 is shown adjustably keyed to lever 46—48 by an adjusting screw 50 rotatably mounted in the lever and meshing with a worm thread 52 externally formed on nut 38. Lever 46 is operated by means such as a tension rod 54 extending through an opening in backing plate 22 at right angles thereto. Lever 46 is operated against the resistance of a compression spring 56 which serves as the return spring of the brake.

The lower ends of the shoes, the weight of which may if desired be carried by a spring 58, are shown held by a tensioned coil spring 60 against a wedge adjustment shown in detail in Figures 4 and 5. This adjustment includes a transversely-extending wedge made in two parts 62 and 64 seated in transverse guides or ways 66 secured to the shoe ends. Part 62 has a transverse cylindrical socket receiving an externally-cylindrical portion of part 64, so that the adjustment also serves as a pivot connecting the shoes.

The adjustment may be operated by means such as a bolt 68, the head of which engages a washer 70 engaging and preferably spot-welded to the end of one of the parts 62—64, and having a tongue 72 which holds the bolt against turning. A nut 74 threaded on bolt 68 engages a thrust part or spacer 76 bridging the ends of the shoes and engaging the sides of the shoe webs. Tightening nut 74 draws wedge 62—64 transversely of the shoes toward member 76 to wedge the shoes apart.

In the arrangement shown, member 62 is formed with a wedge-shaped projection 78 seated in a double-wedge recess in the end of a centering lever 80. Lever 80 is fulcrumed on a pivot 82 mounted on the backing plate, and has a spring 84 tensioned between the backing plate and the other end of the lever movement of the projection 78 in either direction, as the brake is applied, acts on lever 80 to increase the tension of spring 84, so that when the brake is released the spring will cause the shoes to be wedged back to their initial centered position.

In Figure 6, stampings 86 welded to the ends of the shoes form seats for a pair of oppositely-arranged wedges 88 and 90 which can be drawn toward each other by a bolt 92 and nut 94 to wedge the shoes apart.

Figure 7:
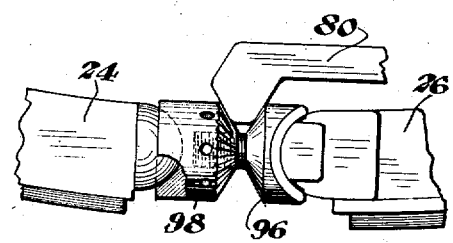
Figures 7, 8, 9 and 10 are respectively sections corresponding to the lower part of Figure 1, but each showing a further and different form of adjustment.

In Figure 7, the end of shoe 26 is curved to seat pivotally in a cylindrical socket in the end of a headed member 96 having a stem on which is adjustably threaded a nut 98 having a spherical socket pivotally receiving the curved end of shoe 24. Member 96 and nut 98 have their adjacent faces of conical form, to provide a wedge recess receiving the wedge-shaped end of the centering lever 80.

Figure 8:
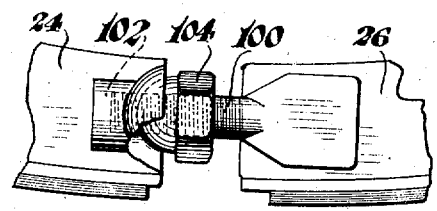

In the arrangement of Figure 8, shoe 26 has formed integrally therewith or secured thereto a threaded stem 100 extending into a relatively large socket 102 in the end of shoe 24, and on which is threaded a nut 104 having a spherical base pivotally arranged in a spherical seat formed in the end of shoe 24.

Figure 9:
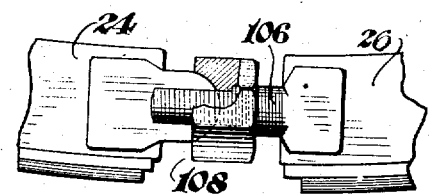
Figure 10:
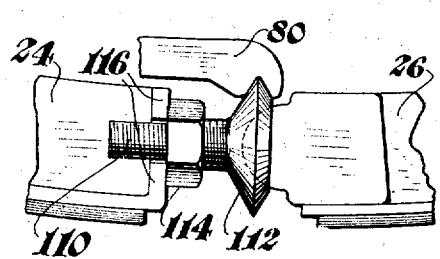

In the arrangement shown in Figure 9, a member 106 secured fixedly to the end of shoe 26 is externally threaded to receive an adjusting nut 108 in thrust engagement with shoe 24 and is vertically slotted to form a fork embracing the end of the web of shoe 24. Nut 108 may be formed with a spherical seat pivotally receiving the curved end of shoe 24. In Figure 10, however, the threaded member 110, while slotted to embrace the end of shoe 24, is not secured fixedly to shoe 26, but has a head 112 formed with a spherical seat pivotally receiving the rounded end of shoe 26. The thrust nut 114 in this case, while adjustably threaded on member 110, has a square base engaging shoe 24. Shoe 24 may have pairs of projections 116 embracing member 110 to prevent it from moving heightwise of the shoe. Head 112 is shown with a conical surface wedgingly received in a wedge-shaped recess in the end of the centering lever 80.

While several illustrative embodiments have been described in detail, it is not my intention to limit the scope of the invention to those particular embodiments, or otherwise than by the terms of the appended claims. The above described adjustments are claimed in my divisional applications Nos. 520,800, 520,801, and 520,802, all filed March 7, 1931.

The present application is junior to my application No. 286,203, filed June 18, 1928, and it is not my intention to claim herein any subject-matter disclosed and claimed in said prior application.

I claim:

1. A brake comprising, in combination, a drum, friction means having one part which anchors when the drum is turning in one direction and having a different part which anchors when the drum is turning in the other direction, and an applying device shiftable bodily to allow either of said parts to anchor and including threaded members connected respectively to the ends of said friction means and a right-and-left threaded rotatable nut threaded on said members and operable to force them in opposite directions to apply the brake.

2. A brake comprising, in combination, friction means having separable ends, and an applying device including threaded members connected respectively to said ends, a right-and-left threaded rotatable nut threaded on said members and operable to force them in opposite directions to apply the brake, and threaded means for adjusting the brake-released position of said nut.

3. A brake comprising, in combination, friction means having separable ends, and an applying device including threaded members connected respectively to said ends and a right-and-left threaded rotatable nut threaded on said members and operable to force them in opposite directions to apply the brake, said applying device being shiftable bodily to balance its action on said ends.

4. A brake comprising, in combination, a friction device having alternatively-effective anchors adjacent its ends, and an applying device which is bodily shiftable to permit the friction device to anchor at either end and which includes a pair of threaded thrust members, arranged end to end, a right-and-left threaded nut rotatably and operatively threaded on the adjacent ends of said members, and an operating lever adjustably mounted on said nut and arranged to operate it.

5. An operating device for a brake or the like comprising, in combination, a pair of members arranged end to end, an externally-threaded part rotatably mounted on said members and arranged to act on said members to force them apart, an operating lever having a portion embracing said part, and an adjusting screw mounted in and carried by said portion of the lever and meshing with the externally-threaded part and operable to adjust the lever angularly on said part.

6. An operating device for a brake or the like comprising, in combination, a pair of members arranged end to end, a part rotatably mounted on said members and arranged to act on said members to force them apart, an operating lever having a portion embracing said part, and an adjusting device mounted in and carried by said portion of the lever and keying the lever to said part and which is operable to adjust the lever angularly on said part.

7. An operating device for a brake or the like comprising, in combination, a bracket having spaced alined bearings, thrust members slidably supported in said bearings, a nut rotatably supported with respect to said bearings and embracing portions of said thrust members and connected to them respectively by right and left threads, and operating means for rotating said nut.

8. An operating device for a brake or the like comprising, in combination, a bracket having spaced alined bearings, separable thrust members arranged end to end, a part rotatably supported with respect to said bearings, and operatively connected to said thrust members in such a manner as to force them apart when it is turned, and operating means for rotating said part, together with a supporting plate and means for shiftably mounting said bracket on the supporting plate.

9. An operating lever having a hub formed with spaced bearings, an operating nut rotatably mounted in said bearings, and an adjusting screw keying the nut to the lever and which is operable to turn the nut in said bearings.

10. An operating lever having a hub formed with spaced bearings, and an operating nut rotatably mounted in said bearings.

11. An operating lever having a hub formed with spaced bearings, and an operating nut rotatably mounted in said bearings, the lever being formed in two separate halves secured together with the nut permanently mounted between them.

12. A brake having a drum, a support at the open side of the drum, friction means within the drum arranged to anchor at one end when the drum is turning in one direction and at the other end when the drum is turning in the other direction, and a floating operating assembly acting on said ends to apply the brake and shiftable as a unit to permit anchorage at either of said ends and comprising a pair of members acting on the ends of the friction means and a part between and wedging apart said pair of members and which part has a lever inside the brake and swinging in a plane at right angles to the plane of the support, and a tension element for operating said lever and attached thereto and passing outwardly through the support said lever being adjustably secured to said part.

13. A brake having a drum, a support at the open side of the drum, friction means within the drum having adjacent separable ends, and a floating operating assembly acting on said ends to apply the brake and shiftable as a unit to balance its action on said ends and comprising a pair of members acting on said ends of the friction means and a part between and wedging apart said pair of members and which part has a lever inside the brake and swinging in a plane at right angles to the plane of the support, a tension element for operating said lever and attached thereto and passing outwardly through the support and means for rotating said part with respect to said lever to effect an adjustment of the brake.

MONTGOMERY W. McCONKEY.

CERTIFICATE OF CORRECTION.

Patent No. 2,051,879.                                    August 25, 1936.

MONTGOMERY W. McCONKEY

It is hereby certified that error appears in the printed specification of the above numbered patent requiring correction as follows: Page 2, second column, line 1, before the word "device" insert 2. A brake comprising in combination, friction means having separable ends, and an applying; and that the said Letters Patent should be read with this correction therein that the same may conform to the record of the case in the Patent Office.

Signed and sealed this 24th day of August, A. D. 1937.

Leslie Frazer (Seal)

Acting Commissioner of Patents.

formed in two separate halves secured together with the nut permanently mounted between them.

12. A brake having a drum, a support at the open side of the drum, friction means within the drum arranged to anchor at one end when the drum is turning in one direction and at the other end when the drum is turning in the other direction, and a floating operating assembly acting on said ends to apply the brake and shiftable as a unit to permit anchorage at either of said ends and comprising a pair of members acting on the ends of the friction means and a part between and wedging apart said pair of members and which part has a lever inside the brake and swinging in a plane at right angles to the plane of the support, and a tension element for operating said lever and attached thereto and passing outwardly through the support said lever being adjustably secured to said part.

13. A brake having a drum, a support at the open side of the drum, friction means within the drum having adjacent separable ends, and a floating operating assembly acting on said ends to apply the brake and shiftable as a unit to balance its action on said ends and comprising a pair of members acting on said ends of the friction means and a part between and wedging apart said pair of members and which part has a lever inside the brake and swinging in a plane at right angles to the plane of the support, a tension element for operating said lever and attached thereto and passing outwardly through the support and means for rotating said part with respect to said lever to effect an adjustment of the brake.

MONTGOMERY W. McCONKEY.

CERTIFICATE OF CORRECTION.

Patent No. 2,051,879.  August 25, 1936.

MONTGOMERY W. McCONKEY

It is hereby certified that error appears in the printed specification of the above numbered patent requiring correction as follows: Page 2, second column, line 1, before the word "device" insert 2. A brake comprising in combination, friction means having separable ends, and an applying; and that the said Letters Patent should be read with this correction therein that the same may conform to the record of the case in the Patent Office.

Signed and sealed this 24th day of August, A. D. 1937.

Leslie Frazer (Seal)

Acting Commissioner of Patents.

CERTIFICATE OF CORRECTION.

Patent No. 2,051,879. August 25, 1936.

MONTGOMERY W. McCONKEY

It is hereby certified that error appears in the printed specification of the above numbered patent requiring correction as follows: Page 2, second column, line 1, before the word "device" insert 2. A brake comprising in combination, friction means having separable ends, and an applying; and that the said Letters Patent should be read with this correction therein that the same may conform to the record of the case in the Patent Office.

Signed and sealed this 24th day of August, A. D. 1937.

Leslie Frazer (Seal)

Acting Commissioner of Patents.